(12) United States Patent
Gorrell et al.

(10) Patent No.: US 7,583,370 B2
(45) Date of Patent: *Sep. 1, 2009

(54) RESONANT STRUCTURES AND METHODS FOR ENCODING SIGNALS INTO SURFACE PLASMONS

(75) Inventors: Jonathan Gorrell, Gainesville, FL (US); Mark Davidson, Florahome, FL (US); Paul Hart, Kansas City, MO (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/418,099

(22) Filed: May 5, 2006

(65) Prior Publication Data

US 2008/0067940 A1    Mar. 20, 2008

(51) Int. Cl.
*G01N 21/00*    (2006.01)
*H01P 1/04*    (2006.01)

(52) U.S. Cl. .................. 356/73.1; 333/13; 250/494.1; 315/39

(58) Field of Classification Search ............... 356/73.1; 250/494.1
See application file for complete search history.

(56) References Cited

U.S. PATENT DOCUMENTS

| 1,948,384 A | 2/1934 | Lawrence |
| 2,307,086 A | 1/1943 | Varian et al. |
| 2,431,396 A | 11/1947 | Hansell |
| 2,473,477 A | 6/1949 | Smith |

(Continued)

FOREIGN PATENT DOCUMENTS

EP    0237559 B1    12/1991

(Continued)

OTHER PUBLICATIONS

U.S. Appl. No. 11/418,082, May 5, 2006, Gorrell et al.

(Continued)

*Primary Examiner*—Tarifur Chowdhury
*Assistant Examiner*—Tara S Pajoohi
(74) *Attorney, Agent, or Firm*—Davidson Berquist Jackson & Gowdey LLP

(57) ABSTRACT

A device for coupling an input signal to an output signal includes a metal transmission line; an ultra-small resonant receiver structure operatively connected to an end of the transmission line constructed and adapted receive the input signal and to cause at least part of the input signal to be passed along the transmission line in the form of plasmons; an ultra-small resonant transmitter structure operatively connected to another end of the transmission line and constructed and adapted to receive at least some of the plasmons corresponding to the input signal on the transmission line and to transmit the received signal as an output signal; a source of charged particles constructed and adapted to deliver a beam of charged particles along a path adjacent the ultra-small resonant receiver structure, wherein the input signal is encoded in the beam of charged particles; and a detector mechanism constructed and adapted to detect the output signal from the ultra-small resonant transmitter structure and to provide a signal representative of the output signal to another circuit. The receiver and/or transmitter structures may be formed on, in or adjacent to the transmission line.

20 Claims, 8 Drawing Sheets

U.S. PATENT DOCUMENTS

| | | |
|---|---|---|
| 2,634,372 A | 4/1953 | Salisbury |
| 2,932,798 A | 4/1960 | Kerst et al. |
| 2,944,183 A | 7/1960 | Drexler |
| 2,966,611 A | 12/1960 | Sandrstrom |
| 3,231,779 A | 1/1966 | White |
| 3,297,905 A | 1/1967 | Rockwell et al. |
| 3,315,117 A | 4/1967 | Udelson |
| 3,387,169 A | 6/1968 | Farney |
| 3,543,147 A | 11/1970 | Kovarik |
| 3,546,524 A | 12/1970 | Stark |
| 3,560,694 A | 2/1971 | White |
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos |
| 4,450,554 A | 5/1984 | Steensma et al. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A | 2/1988 | Chang et al. |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park |
| 5,780,970 A | 7/1998 | Singh et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 | 10/2003 | Madey et al. |
| 6,636,653 B2 | 10/2003 | Miracky et al. |

| | | |
|---|---|---|
| 6,640,023 B2 | 10/2003 | Miller et al. |
| 6,642,907 B2 | 11/2003 | Hamada et al. |
| 6,687,034 B2 | 2/2004 | Wine et al. |
| 6,724,486 B1 | 4/2004 | Shull et al. |
| 6,738,176 B2 | 5/2004 | Rabinowitz et al. |
| 6,741,781 B2 | 5/2004 | Furuyama |
| 6,782,205 B2 | 8/2004 | Trisnadi et al. |
| 6,791,438 B2 | 9/2004 | Takahashi et al. |
| 6,800,877 B2 | 10/2004 | Victor et al. |
| 6,801,002 B2 | 10/2004 | Victor et al. |
| 6,819,432 B2 | 11/2004 | Pepper et al. |
| 6,829,286 B1 | 12/2004 | Guilfoyle et al. |
| 6,834,152 B2 | 12/2004 | Gunn et al. |
| 6,870,438 B1 | 3/2005 | Shino et al. |
| 6,871,025 B2 | 3/2005 | Maleki et al. |
| 6,885,262 B2 | 4/2005 | Nishimura et al. |
| 6,900,447 B2 | 5/2005 | Gerlach et al. |
| 6,909,092 B2 | 6/2005 | Nagahama et al. |
| 6,909,104 B1 | 6/2005 | Koops |
| 6,924,920 B2 | 8/2005 | Zhilkov |
| 6,936,981 B2 | 8/2005 | Gesley |
| 6,943,650 B2 | 9/2005 | Ramprasad et al. |
| 6,944,369 B2 | 9/2005 | Deliwala |
| 6,952,492 B2 | 10/2005 | Tanaka et al. |
| 6,953,291 B2 | 10/2005 | Liu |
| 6,954,515 B2 | 10/2005 | Bjorkholm et al. |
| 6,965,284 B2 | 11/2005 | Maekawa et al. |
| 6,965,625 B2 | 11/2005 | Mross et al. |
| 6,972,439 B1 | 12/2005 | Kim et al. |
| 6,995,406 B2 | 2/2006 | Tojo et al. |
| 7,010,183 B2 | 3/2006 | Estes et al. |
| 7,064,500 B2 | 6/2006 | Victor et al. |
| 7,068,948 B2 | 6/2006 | Wei et al. |
| 7,092,588 B2 | 8/2006 | Kondo |
| 7,092,603 B2 | 8/2006 | Glebov et al. |
| 7,122,978 B2 | 10/2006 | Nakanishi et al. |
| 7,130,102 B2 | 10/2006 | Rabinowitz |
| 7,177,515 B2 | 2/2007 | Estes et al. |
| 7,230,201 B1 | 6/2007 | Miley et al. |
| 7,253,426 B2 | 8/2007 | Gorrell et al. |
| 7,267,459 B2 | 9/2007 | Matheson |
| 7,267,461 B2 | 9/2007 | Kan et al. |
| 7,309,953 B2 | 12/2007 | Tiberi et al. |
| 7,342,441 B2 | 3/2008 | Gorrell et al. |
| 7,362,972 B2 | 4/2008 | Yavor et al. |
| 7,375,631 B2 | 5/2008 | Moskowitz et al. |
| 7,436,177 B2 | 10/2008 | Gorrell et al. |
| 7,442,940 B2 | 10/2008 | Gorrell et al. |
| 7,443,358 B2 | 10/2008 | Gorrell et al. |
| 7,470,920 B2 | 12/2008 | Gorrell et al. |
| 7,473,917 B2 | 1/2009 | Singh |
| 2001/0025925 A1 | 10/2001 | Abe et al. |
| 2002/0009723 A1 | 1/2002 | Hefti |
| 2002/0027481 A1 | 3/2002 | Fiedziuszko |
| 2002/0036121 A1 | 3/2002 | Ball et al. |
| 2002/0036264 A1 | 3/2002 | Nakasuji et al. |
| 2002/0053638 A1 | 5/2002 | Winkler et al. |
| 2002/0068018 A1 | 6/2002 | Pepper et al. |
| 2002/0070671 A1 | 6/2002 | Small |
| 2002/0071457 A1 | 6/2002 | Hogan |
| 2002/0135665 A1 | 9/2002 | Gardner |
| 2002/0191650 A1 | 12/2002 | Madey et al. |
| 2003/0010979 A1 | 1/2003 | Pardo |
| 2003/0012925 A1 | 1/2003 | Gorrell |
| 2003/0016421 A1 | 1/2003 | Small |
| 2003/0034535 A1 | 2/2003 | Barenburg et al. |
| 2003/0103150 A1 | 6/2003 | Catrysse et al. |
| 2003/0106998 A1 | 6/2003 | Colbert et al. |
| 2003/0155521 A1 | 8/2003 | Feuerbaum |
| 2003/0158474 A1 | 8/2003 | Scherer et al. |
| 2003/0164947 A1 | 9/2003 | Vaupel |
| 2003/0179974 A1 | 9/2003 | Estes et al. |
| 2003/0206708 A1* | 11/2003 | Estes et al. ................ 385/130 |
| 2003/0214695 A1 | 11/2003 | Abramson et al. |
| 2004/0061053 A1 | 4/2004 | Taniguchi et al. |
| 2004/0080285 A1 | 4/2004 | Victor et al. |
| 2004/0085159 A1 | 5/2004 | Kubena et al. |
| 2004/0092104 A1 | 5/2004 | Gunn, III et al. |
| 2004/0108471 A1 | 6/2004 | Luo et al. |
| 2004/0108473 A1 | 6/2004 | Melnychuk et al. |
| 2004/0136715 A1 | 7/2004 | Kondo |
| 2004/0150991 A1 | 8/2004 | Ouderkirk et al. |
| 2004/0171272 A1 | 9/2004 | Jin et al. |
| 2004/0180244 A1 | 9/2004 | Tour et al. |
| 2004/0184270 A1 | 9/2004 | Halter |
| 2004/0213375 A1 | 10/2004 | Bjorkholm et al. |
| 2004/0217297 A1 | 11/2004 | Moses et al. |
| 2004/0218651 A1 | 11/2004 | Iwasaki et al. |
| 2004/0231996 A1 | 11/2004 | Webb |
| 2004/0240035 A1 | 12/2004 | Zhilkov |
| 2004/0264867 A1 | 12/2004 | Kondo |
| 2005/0023145 A1 | 2/2005 | Cohen et al. |
| 2005/0045821 A1 | 3/2005 | Noji et al. |
| 2005/0045832 A1 | 3/2005 | Kelly et al. |
| 2005/0054151 A1 | 3/2005 | Lowther et al. |
| 2005/0067286 A1 | 3/2005 | Ahn et al. |
| 2005/0082469 A1 | 4/2005 | Carlo |
| 2005/0092929 A1 | 5/2005 | Schneiker |
| 2005/0104684 A1 | 5/2005 | Wojcik |
| 2005/0105690 A1 | 5/2005 | Pau et al. |
| 2005/0145882 A1 | 7/2005 | Taylor et al. |
| 2005/0152635 A1 | 7/2005 | Paddon et al. |
| 2005/0162104 A1 | 7/2005 | Victor et al. |
| 2005/0190637 A1 | 9/2005 | Ichimura et al. |
| 2005/0194258 A1 | 9/2005 | Cohen et al. |
| 2005/0201707 A1 | 9/2005 | Glebov et al. |
| 2005/0201717 A1 | 9/2005 | Matsumura et al. |
| 2005/0212503 A1 | 9/2005 | Deibele |
| 2005/0231138 A1 | 10/2005 | Nakanishi et al. |
| 2005/0249451 A1 | 11/2005 | Baehr-Jones et al. |
| 2005/0285541 A1 | 12/2005 | LeChevalier |
| 2006/0007730 A1 | 1/2006 | Nakamura et al. |
| 2006/0018619 A1 | 1/2006 | Helffrich et al. |
| 2006/0020667 A1 | 1/2006 | Lys et al. |
| 2006/0035173 A1 | 2/2006 | Davidson et al. |
| 2006/0045418 A1 | 3/2006 | Cho et al. |
| 2006/0050269 A1 | 3/2006 | Brownell |
| 2006/0060782 A1 | 3/2006 | Khursheed |
| 2006/0062258 A1 | 3/2006 | Brau et al. |
| 2006/0131695 A1 | 6/2006 | Kuekes et al. |
| 2006/0159131 A1 | 7/2006 | Liu et al. |
| 2006/0164496 A1 | 7/2006 | Tokutake et al. |
| 2006/0187794 A1 | 8/2006 | Harvey et al. |
| 2006/0216940 A1 | 9/2006 | Gorrell et al. |
| 2006/0243925 A1 | 11/2006 | Barker et al. |
| 2006/0274922 A1 | 12/2006 | Ragsdale |
| 2007/0003781 A1 | 1/2007 | de Rochemont |
| 2007/0013765 A1 | 1/2007 | Hudson et al. |
| 2007/0075264 A1 | 4/2007 | Gorrell et al. |
| 2007/0086915 A1 | 4/2007 | LeBoeuf et al. |
| 2007/0116420 A1 | 5/2007 | Estes et al. |
| 2007/0146704 A1 | 6/2007 | Schmidt et al. |
| 2007/0152176 A1 | 7/2007 | Gorrell et al. |
| 2007/0154846 A1 | 7/2007 | Gorrell et al. |
| 2007/0194357 A1 | 8/2007 | Oohashi |
| 2007/0200940 A1 | 8/2007 | Gruhlke et al. |
| 2007/0252983 A1 | 11/2007 | Tong et al. |
| 2007/0258689 A1 | 11/2007 | Gorrell et al. |
| 2007/0258690 A1 | 11/2007 | Gorrell et al. |
| 2007/0259641 A1 | 11/2007 | Gorrell |
| 2007/0264023 A1 | 11/2007 | Gorrell et al. |
| 2007/0264030 A1 | 11/2007 | Gorrell et al. |
| 2007/0284527 A1 | 12/2007 | Zani et al. |
| 2008/0069509 A1 | 3/2008 | Gorrell et al. |

| | | | |
|---|---|---|---|
| 2008/0302963 | A1 | 12/2008 | Nakasuji et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 2000/072413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
"Array of Nanoklystrons for Frequency Agility or Redundancy," NASA's Jet Propulsion Laboratory, NASA Tech Briefs, NPO-21033. 2001.
"Hardware Development Programs," Calabazas Creek Research, Inc. found at http://calcreek.com/hardware.html.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html.
Alford, T.L. et al., "Advanced silver-based metallization patterning for ULSI applications," Microelectronic Engineering 55, 2001, pp. 383-388, Elsevier Science B.V.

Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Booske, J.H. et al., "Microfabricated TWTs as High Power, Wideband Sources of THz Radiation".
Brau, C.A. et al., "Gain and Coherent Radiation from a Smith-Purcell Free Electron Laser," Proceedings of the 2004 FEL Conference, pp. 278-281.
Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-673, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High -Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.
Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/ posters/session 3/3-43manohara_poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Photonics Research, "Surface-Plasmon-Enhanced Random Laser Demonstrated," Phototonics Spectra, Feb. 2005, pp. 112-113.

Platt, C.L. et al. ,"A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 μm quantum dot laser wtih temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.

Search Report and Written Opinion mailed Sep. 13, 2007 in PCT Appln. No. PCT/US2006/024217.

Search Report and Written Opinion mailed Sep. 17, 2007 in PCT Appln. No. PCT/US2006/022787.

Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.

International Search Report and Written Opinion mailed Nov. 23, 2007 in International Application No. PCT/US2006/022786.

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.

Search Report and Written Opinion mailed Sep. 25, 2007 in PCT appln. No. PCT/US2006/022681.

Search Report and Written Opinion mailed Sep. 26, 2007 in PCT Appln. No. PCT/US2006/024218.

Neo et al., "Smith-Purcell Radiation from Ultraviolet to Infrared Using a Si-field Emitter" Vacuum Electronics Conference, 2007, IVEC '07, IEEE International May 2007.
Search Report and Written Opinion mailed Jul. 14, 2008 in PCT Appln. No. PCT/US2006/022773.
Search Report and Written Opinion mailed Aug. 19, 2008 in PCT Appln. No. PCT/US2007/008363.
Search Report and Written Opinion mailed Jul. 16, 2008 in PCT Appln. No. PCT/US2006/022766.
Search Report and Written Opinion mailed Jul. 28, 2008 in PCT Appln. No. PCT/US2006/022782.
Search Report and Written Opinion mailed Jul. 3, 2008 in PCT Appln. No. PCT/US2006/022690.
Search Report and Written Opinion mailed Jul. 3, 2008 in PCT Appln. No. PCT/US2006/022778.
Search Report and Written Opinion mailed Jul. 7, 2008 in PCT Appln. No. PCT/US2006/022686.
Search Report and Written Opinion mailed Jul. 7, 2008 in PCT Appln. No. PCT/US2006/022785.
Search Report and Written Opinion mailed Sep. 2, 2008 in PCT Appln. No. PCT/US2006/022769.
Search Report and Written Opinion mailed Sep. 26, 2008 in PCT Appln. No. PCT/US2007/00053.
Search Report and Written Opinion mailed Sep. 3, 2008 in PCT Appln. No. PCT/US2006/022770.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
U.S. Appl. No. 11/418,082, filed May 5, 2006, Gorrell et al.
"An Early History - Invention of the Klystron," http://varianinc.com/cgi-bin/advprint/print.cgi?cid=KLQNPPJJFJ, printed on Dec. 26, 2008.
"An Early History - The Founding of Varian Associates," http://varianinc.com/cgi-bin/advprint/print.cgi?cid=KLQNPPJJFJ, printed on Dec. 26, 2008.
"Chapter 3 X-Ray Tube," http://compepid.tuskegee.edu/syllabi/clinical/small/radiology/chapter . . . , printed from tuskegee.edu on Dec. 29, 2008.
"Diagnostic imaging modalities - Ionizing vs non-ionizing radiation," http://info.med.yale.edu/intmed/cardio/imaging/techniques/ionizing_v . . . , printed from Yale University School of Medicine on Dec. 29, 2008.
"Frequently Asked Questions," Luxtera Inc., found at http://www.luxtera.com/technology_faq.htm, printed on Dec. 2, 2005, 4 pages.
"Klystron Amplifier," http://www.radartutorial.eu/08.transmitters/tx12.en.html, printed on Dec. 26, 2008.
"Klystron is a Micowave Generator," http://www2.slac.stanford.edu/vvc/accelerators/klystron.html, printed on Dec. 26, 2008.
"Klystron," http:en.wikipedia.org/wiki/Klystron, printed on Dec. 26, 2008.
"Making X-rays," http://www.fnrfscience.cmu.ac.th/theory/radiation/xray-basics.html, printed on Dec. 29, 2008.
"Microwave Tubes," http://www.tpub.com/neets/book11/45b.htm, printed on Dec. 26, 2008.
"Notice of Allowability" mailed on Jan. 17, 2008 in U.S. Appl. No. 11/418,082 filed May 5, 2006.
"Technology Overview," Luxtera, Inc., found at http://www.luxtera.com/technology.htm, printed on Dec. 2, 2005, 1 page.

"The Reflex Klystron," http://www.fnrfscience.cmu.ac.th/theory/microwave/microwave%2, printed from Fast Netoron Research Facilty on Dec. 26, 2008.
"x-ray tube," http://www.answers.com/topic/x-ray-tube, printed on Dec. 29, 2008.
Mar. 24, 2006 PTO Office Action in U.S. Appl. No. 10/917,511.
Mar. 25, 2008 PTO Office Action in U.S. Appl. No. 11/411,131.
Apr. 08, 2008 PTO Office Action in U.S. Appl. No. 11/325,571.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 16, 2008 Response to PTO Office Action of Dec. 14, 2007 in U.S. Appl. No. 11/418,264.
Jun. 20, 2008 Response to PTO Office Action of Mar. 25, 2008 in U.S. Appl. No. 11/411,131.
Aug. 14, 2006 PTO Office Action in U.S. Appl. No. 10/917,511.
Sep. 01, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Oct. 19, 2007 Response to PTO Office Action of May 21, 2007 in U.S. Appl. No. 11/418,087.
Dec. 04, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 20, 2007 PTO Office Action in U.S. Appl. No. 11/418,087.
Corcoran, Elizabeth, "Ride the Light," Forbes Magazine, Apr. 11, 2005, pp. 68- 70.
European Search Report mailed Mar. 3, 2009 in European Application No. 06852028.7.
Ossia, Babak, "The X-Ray Production," Department of Biomedical Engineering - University of Rhode Island, 1 page. Fall 2007.
Sadwick, Larry et al., "Microfabricated next-generation millimeter-wave power amplifiers," www.rfdesign.com Feb. 2004.
Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.
Sartori, Gabriele, "CMOS Photonics Platform," Luxtera, Inc., Nov. 2005, 19 pages.
Thumm, Manfred, "Historical German Contributions to Physics and Applications of Electromagnetic Oscillations and Waves." in "History of Wireless", Tapan K. Sarkar et al., eds., John Wiley & Sons, Inc. pp. 327-348, 2006.
U.S. Appl. No. 11/203,407 - Nov. 13, 2008 PTO Office Action.
U.S. Appl. No. 11/238,991 - Dec. 6, 2006 PTO Office Action.
U.S. Appl. No. 11/238,991 - Jun. 6, 2007 Response to PTO Office Action of Dec. 6, 2006.
U.S. Appl. No. 11/238,991 - Sep. 10, 2007 PTO Office Action.
U.S. Appl. No. 11/238,991 - Mar. 6, 2008 Response to PTO Office Action of Sep. 10, 2007.
U.S. Appl. No. 11/238,991 - Jun. 27, 2008 PTO Office Action.
U.S. Appl. No. 11/238,991 - Dec. 29, 2008 Response to PTO Office Action of Jun. 27, 2008.
U.S. Appl. No. 11/238,991 - Mar. 24, 2009 PTO Office Action.
U.S. Appl. No. 11/243,477 - Apr. 25, 2008 PTO Office Action.
U.S. Appl. No. 11/243,477 - Oct. 24, 2008 Response to PTO Office Action of Apr. 25, 2008.
U.S. Appl. No. 11/243,477 - Jan. 7, 2009 PTO Office Action.
U.S. Appl. No. 11/325,448 - Jun. 16, 2008 PTO Office Action.
U.S. Appl. No. 11/325,448 - Dec. 16, 2008 Response to PTO Office Action of Jun. 16, 2008.
U.S. Appl. No. 11/325,534 - Jun. 11, 2008. PTO Office Action.
U.S. Appl. No. 11/325,534 - Oct. 15, 2008 Response to PTO Office Action of Jun. 11, 2008.
U.S. Appl. No. 11/353,208 - Jan. 15, 2008 PTO Office Action.
U.S. Appl. No. 11/353,208 - Mar. 17, 2008 PTO Office Action.

U.S. Appl. No. 11/353,208 - Sep. 15, 2008 Response to PTO Office Action of Mar. 17, 2008.
U.S. Appl. No. 11/353,208 - Dec. 24, 2008 PTO Office Action.
U.S. Appl. No. 11/353,208 - Dec. 30, 2008 Response to PTO Office Action of Dec. 24, 2008.
U.S. Appl. No. 11/400,280 - Oct. 16, 2008 PTO Office Action.
U.S. Appl. No. 11/400,280 - Oct. 24, 2008 Response to PTO Office Action of Oct. 16, 2008.
U.S. Appl. No. 11/410,905 - Sep. 26, 2008 PTO Office Action.
U.S. Appl. No. 11/410,905 - Mar. 26, 2009 Response to PTO Office Action of Sep. 26, 2008.
U.S. Appl. No. 11/410,924 - Mar. 3, 2009 PTO Office Action.
U.S. Appl. No. 11/411,120 - Mar. 19, 2009 PTO Office Action.
U.S. Appl. No. 11/411,129 - Jan. 16, 2009 Office Action.
U.S. Appl. No. 11/411,130 - May 1, 2008 PTO Office Action.
U.S. Appl. No. 11/411,130 - Oct. 29, 2008 Response to PTO Office Action of May 1, 2008.
U.S. Appl. No. 11/417,129 - Nov. 7, 2007 PTO Office Action.
U.S. Appl. No. 11/417,129 - Dec. 17, 2007 Response to PTO Office Action of Jul. 11, 2007.
U.S. Appl. No. 11/417,129 - Dec. 20, 2007 Response to PTO Office Action of Jul. 11, 2007.
U.S. Appl. No. 11/417,129 - Apr. 17, 2008 PTO Office Action.
U.S. Appl. No. 11/417,129 - Jun. 19, 2008 Response to PTO Office Action of Apr. 17, 2008.
U.S. Appl. No. 11/418,079 - Apr. 11, 2008 PTO Office Action.
U.S. Appl. No. 11/418,079 - Oct. 7, 2008 Response to PTO Office Action of Apr. 11, 2008.
U.S. Appl. No. 11/418,079 - Feb. 12, 2009 PTO Office Action.
U.S. Appl. No. 11/418,080 - Mar. 18, 2009 PTO Office Action.
U.S. Appl. No. 11/418,082 - Jan. 17, 2007 PTO Office Action.
U.S. Appl. No. 11/418,083 - Jun. 20, 2008 PTO Office Action.
U.S. Appl. No. 11/418,083 - Dec. 18, 2008 Response to PTO Office Action of Jun. 20, 2008.
U.S. Appl. No. 11/418,084 - Nov. 5, 2007 PTO Office Action.
U.S. Appl. No. 11/418,084 - May 5, 2008 Response to PTO Office Action of Nov. 5, 2007.
U.S. Appl. No. 11/418,084 - Aug. 19, 2008 PTO Office Action.
U.S. Appl. No. 11/418,084 - Feb. 19, 2009 Response to PTO Office Action of Aug. 19, 2008.
U.S. Appl. No. 11/418,085 - Aug. 10, 2007 PTO Office Action.
U.S. Appl. No. 11/418,085 - Nov. 13, 2007 Response to PTO Office Action of Aug. 10, 2007.
U.S. Appl. No. 11/418,085 - Feb. 12, 2008 PTO Office Action.
U.S. Appl. No. 11/418,085 - Aug. 12, 2008 Response to PTO Office Action of Feb. 12, 2008.
U.S. Appl. No. 11/418,085 - Sep. 16, 2008 PTO Office Action.
U.S. Appl. No. 11/418,085 - Mar. 6, 2009 Response to PTO Office Action of Sep. 16, 2008.
U.S. Appl. No. 11/418,087 - Dec. 29, 2006 Response to PTO Office Action of Dec. 4, 2006.
U.S. Appl. No. 11/418,087 - Feb. 15, 2007 PTO Office Action.
U.S. Appl. No. 11/418,087 - Mar. 6, 2007 Response to PTO Office Action of Feb. 15, 2007.
U.S. Appl. No. 11/418,088 - Mar. 9, 2008 PTO Office Action.
U.S. Appl. No. 11/418,088 - Dec. 8, 2008 Response to PTO Office Action of Jun. 9, 2008.
U.S. Appl. No. 11/418,089 - Mar. 21, 2008 PTO Office Action.
U.S. Appl. No. 11/418,089 - Jun. 23, 2008 Response to PTO Office Action of Mar. 21, 2008.
U.S. Appl. No. 11/418,089 - Sep. 30, 2008 PTO Office Action.
U.S. Appl. No. 11/418,089 - Mar. 30, 2009 Response to PTO Office Action of Sep. 30, 2008.
U.S. Appl. No. 11/418,091 - Jul. 30, 2007 PTO Office Action.
U.S. Appl. No. 11/418,091 - Nov. 27, 2007 Response to PTO Office Action of Jul. 30, 2007.
U.S. Appl. No. 11/418,091 - Feb. 26, 2008 PTO Office Action.
U.S. Appl. No. 11/418,097 - Jun. 2. 2008 PTO Office Action.
U.S. Appl. No. 11/418,097 - Dec. 2, 2008 Response to PTO Office Action of Jun. 2, 2008.
U.S. Appl. No. 11/418,097 - Feb. 18. 2009 PTO Office Action.
U.S. Appl. No. 11/418,100 - Jan. 12, 2009 PTO Office Action.
U.S. Appl. No. 11/418,123 - Apr. 25, 2008 PTO Office Action.
U.S. Appl. No. 11/418,123 - Oct. 27, 2008 Response to PTO Office Action of Apr. 25, 2008.
U.S. Appl. No. 11/418,123 - Jan. 26, 2009 PTO Office Action.
U.S. Appl. No. 11/418,124 - Oct. 1, 2008 PTO Office Action.
U.S. Appl. No. 11/418,124 - Feb. 2, 2009 Response to PTO Office Action of Oct. 1, 2008.
U.S. Appl. No. 11/418,124 - Mar. 13, 2009 PTO Office Action.
U.S. Appl. No. 11/418,126 - Oct. 12, 2006 PTO Office Action.
U.S. Appl. No. 11/418,126 - Feb. 12, 2007 Response to PTO Office Action of Oct. 12, 2006 (Redacted).
U.S. Appl. No. 11/418,126 - Jun. 6, 2007 PTO Office Action.
U.S. Appl. No. 11/418,126 - Aug. 6, 2007 Response to PTO Office Action of Jun. 6, 2007.
U.S. Appl. No. 11/418,126 - Nov. 2, 2007 PTO Office Action.
U.S. Appl. No. 11/418,126 - Feb. 22, 2008 Response to PTO Office Action of Nov. 2, 2007.
U.S. Appl. No. 11/418,126 - Jun. 10, 2008 PTO Office Action.
U.S. Appl. No. 11/418,127 - Apr. 2, 2009 Office Action.
U.S. Appl. No. 11/418,128 - Dec. 16, 2008 PTO Office Action.
U.S. Appl. No. 11/418,128 - Dec. 31, 2008 Response to PTO Office Action of Dec. 16, 2008.
U.S. Appl. No. 11/418,128 - Feb. 17, 2009 PTO Office Action.
U.S. Appl. No. 11/418,129 - Dec. 16, 2008 Office Action.
U.S. Appl. No. 11/418,129 - Dec. 31, 2008 Response to PTO Office Action of Dec. 16, 2008.
U.S. Appl. No. 11/418,244 - Jul. 1, 2008 PTO Office Action.
U.S. Appl. No. 11/418,244 - Nov. 25, 2008 Response to PTO Office Action of Jul. 1, 2008.
U.S. Appl. No. 11/418,263 - Sep. 24, 2008 PTO Office Action.
U.S. Appl. No. 11/418,263 - Dec. 24, 2008 Response to PTO Office Action of Sep. 24, 2008.
U.S. Appl. No. 11/418,263 - Mar. 9, 2009 PTO Office Action.
U.S. Appl. No. 11/418,315 - Mar. 31, 2008 PTO Office Action.
U.S. Appl. No. 11/418,318 - Mar. 31, 2009 PTO Office Action.
U.S. Appl. No. 11/441,219 - Jan. 7, 2009 PTO Office Action.
U.S. Appl. No. 11/522,929 - Oct. 22, 2007 PTO Office Action.
U.S. Appl. No. 11/522,929 - Feb. 21, 2008 Response to PTO Office Action of Oct. 22, 2007.
U.S. Appl. No. 11/641,678 - Jul. 22, 2008 PTO Office Action.
U.S. Appl. No. 11/641,678 - Jan. 22, 2009 Response to Office Action of Jul. 22, 2008.
U.S. Appl. No. 11/711,000 - Mar. 6, 2009 PTO Office Action.
U.S. Appl. No. 11/716,552 - Feb. 12, 2009 Response to PTO Office Action of Feb. 9, 2009.
U.S. Appl. No. 11/716,552 - Jul. 3, 2008 PTO Office Action.
Whiteside, Andy et al., "Dramatic Power Savings using Depressed Collector IOT Transmitters in Digital and Analog Service." Mar. 10, 2006.

* cited by examiner

RESONANT STRUCTURES AND METHODS FOR ENCODING SIGNALS INTO SURFACE PLASMONS

CROSS REFERENCE TO RELATED APPLICATIONS

The present invention is related to the following co-pending U.S. Patent applications which are all commonly owned with the present application, the entire contents of each of which are incorporated herein by reference:
1. U.S. application Ser. No. 11/243,476, filed Oct. 5, 2005, entitled, "Structure and Methods for Coupling Energy from an Electromagnetic Wave;"
2. U.S. application Ser. No. 11/243,477, filed Oct. 5, 2005, entitled, "Electron Beam Induced Resonance;"
3. U.S. application Ser. No. 11/238,991, filed Sep. 30, 2005, entitled, "Light Emitting Free-Electron MicroResonant Structure;"
4. U.S. application Ser. No. 11/302,471, filed Dec. 14, 2005, entitled, "Coupled Nano-Resonating Energy Emitting Structures;"
5. U.S. application Ser. No. 11/325,432, filed Jan. 5, 2006, entitled, "Resonant Structure-Based Display;"
6. U.S. application Ser. No. 11/325,448, filed Jan. 5, 2006, entitled, "Selectable Frequency Light Emitter;"
7. U.S. application Ser. No. 11/325,571, filed Jan. 5, 2006, entitled, "Switching Micro-Resonant Structures by Modulating a Beam of Charged Particles"
8. U.S. application Ser. No. 11/325,534, filed Jan. 5, 2006, entitled, "Switching Micro-Resonant Structures Using at Least One Director."
9. U.S. application Ser. No. 11/349,963, filed Feb. 9, 2006, entitled, "Method and Structure for two Coupling Microcircuits."

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This relates in general to coupling a signal onto, through and from a device and, more particularly, using plasmons to couple the signal.

Introduction

Semiconductor manufacturers are constantly striving to keep up with applications that require faster speeds for their microcircuits. For example, at clock speeds greater than 3 gigahertz, a microprocessor may be required to couple signals to billions of transistors. Further, microcircuits are continuing to be used over a variety of applications (including, e.g., modeling and simulation, games, and internet video processing) requiring faster speed. It is anticipated that microcircuits having faster speeds will continue to be designed for a broad range of systems such as highly parallel supercomputers, back-end servers, desktop systems, and a number of embedded applications.

To meet the needs, semiconductor manufacturers are continuing their challenge to move signals at ever faster speeds. Conductors commonly used on microcircuits to carry electrical signals can include highly doped semiconductor materials or conductive metal strips referred to as metallization. The speed at which signals can travel through these conductors is generally limited by circuit delay. This delay, in part a product of the circuit's resistance and capacitance, can be reduced by lowering the resistance and/or capacitance of the conductor. For example, as speed requirements have increased, manufacturers have reduced the resistance by using copper conductors in place of aluminum. Capacitance can be lowered by using materials adjacent to the conductors having a low dielectric constant. For example, materials such as hydrogen silsesquioxane (HSQ), methyl silsesquioxane (MSQ), fluorinated glass, or so-called Nanoglass can aid in lowering the capacitance. The conduction heat transfer rate (i.e., cooling rate) is normally reduced as the scale of the microcircuit decreases, because the thermal gradient typically required for dissipating the heat generally occurs across a smaller area. Further, a number of high-speed signals may need to be routed through conductors at a common region on the microcircuit. This can result in the formation of hot spots. Dissipating heat from a combination of conductors in a small region compounds the problem of transferring the heat away. Hence, the operational speed through the conductors on a microcircuit can be strongly limited by the circuit delay and the amount of heat generated on the conductors.

As a result, semiconductor manufacturers are aggressively addressing the above problems. One remedy applied by manufacturers to overcome the delay and thermal problems uses optical systems on microcircuits. Optical systems typically include light conducting fibers and provide the advantages of speed and high bandwidth. However, optical systems are relatively bulky compared to electrical conductors, and light is not able to couple through the conductors or metallization as mentioned above. Further, optical systems cannot use other forms of metallization, such as metal bonding pads, bond wires and vias to transfer signals to and from a microcircuit.

A plasmon is the quasiparticle resulting from the quantization of plasma oscillations. Scanning near-field microscopes that put a plasmon on a wire are known. The possibility of getting data encoded onto plasmons has been discussed, but as of yet there has not been a way of electrically detecting the presence of the plasmon.

We describe an improved structure that can couple high-speed signals with the advantages of an optical system and yet employ the metal structures commonly used on microcircuits. In an example of such a structure, plasmons are stimulated to carry a signal to a first portion of the structure. The plasmons are coupled to a second portion of the structure carrying the signal and then the signal is coupled off the structure.

BRIEF DESCRIPTION OF THE DRAWINGS

The following description, given with respect to the attached drawings, may be better understood with reference to the non-limiting examples of the drawings wherein like reference numbers designate like elements.

DETAILED DESCRIPTION OF PRESENTLY PREFERRED EXEMPLARY EMBODIMENTS

Figure 1:
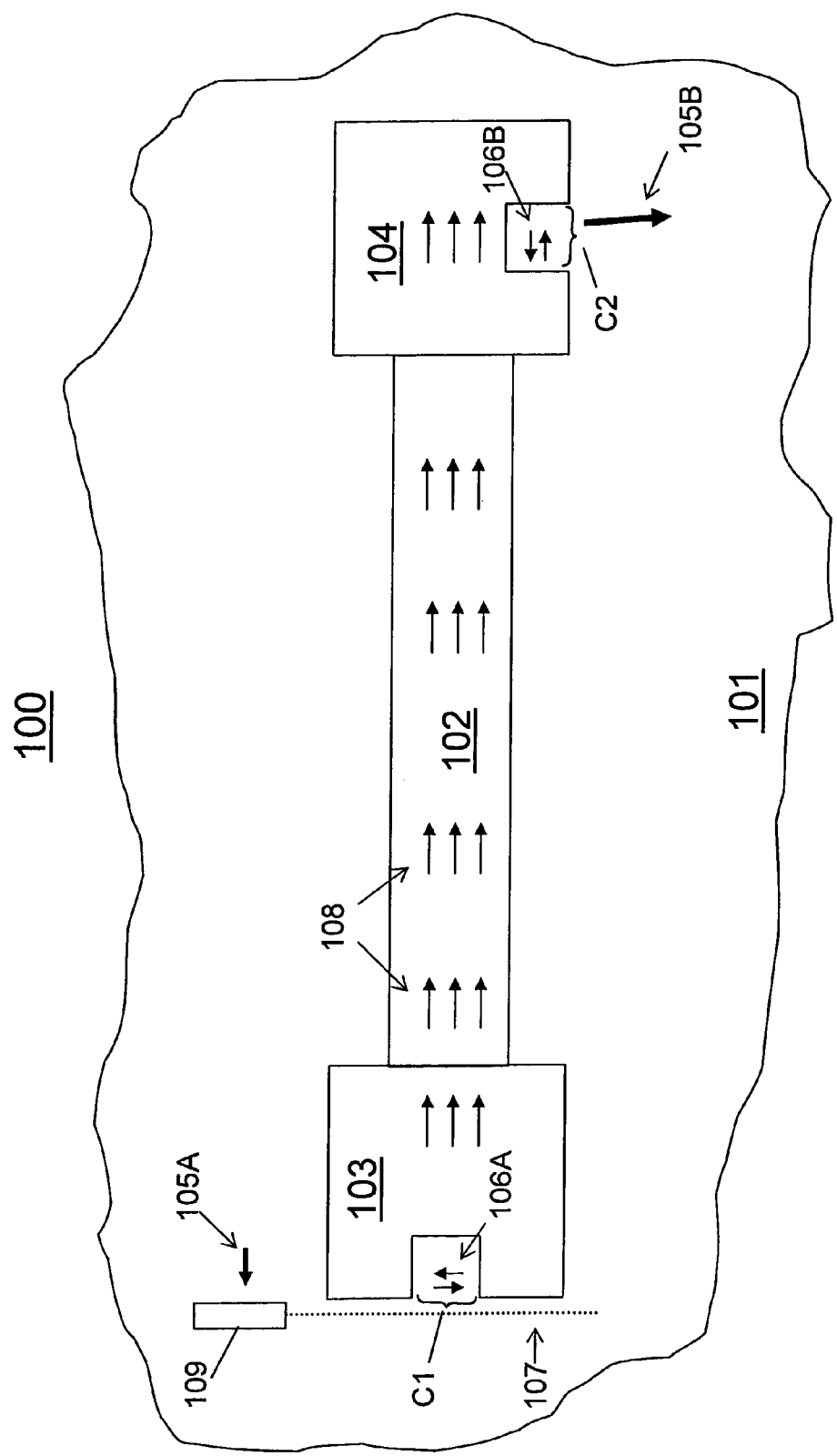
FIG. 1 is an enlarged top-view of a device within a cavity of a microcircuit using plasmons to carry a signal.

The devices described herein may also employ various similar or different example resonant structures like those described in one or more of the following U.S. Patent Applications, each of which is described in greater detail above and incorporated herein by reference: application Ser. Nos. 11/243,476, 11/243,477, 11/238,991, 11/302,471, 11/325,432, 11/325,448, 11/325,571, 11/325,534, and 11/349,963.

Electromagnetic Wave Generation

There are many traditional ways to produce high-frequency radiation in ranges at and above the visible spectrum, for example, up to high hundreds of Terahertz. There are also many traditional and anticipated applications that use such high frequency radiation. As frequencies increase, however, the kinds of structures needed to create the electromagnetic radiation at a desired frequency become generally smaller and harder to manufacture. We have discovered ultra-small-scale devices that obtain multiple different frequencies of radiation from the same operative layer.

Resonant structures have been the basis for much of the presently known high frequency electronics. Devices like klystrons and magnetrons had electronics that moved frequencies of emission up to the megahertz range by the 1930s and 1940s. By around 1960, people were trying to reduce the size of resonant structures to get even higher frequencies, but had limited success because the Q of the devices went down due to the resistivity of the walls of the resonant structures. At about the same time, Smith and Purcell saw the first signs that free electrons could cause the emission of electromagnetic radiation in the visible range by running an electron beam past a diffraction grating. Since then, there has been much speculation as to what the physical basis for the Smith-Purcell radiation really is.

We have shown that some of the theory of resonant structures applies to certain nano structures that we have built. It is assumed that at high enough, frequencies, plasmons conduct the energy as opposed to the bulk transport of electrons in the material, although our inventions are not dependent upon such an explanation. Under that theory, the electrical resistance decreases to the point where resonance can effectively occur again, and makes the devices efficient enough to be commercially viable.

Myriad benefits and advantages can be obtained by a ultra-small resonant structure that emits varying electromagnetic radiation at higher radiation frequencies such as infrared, visible, UV and X-ray. For example, if the varying electromagnetic radiation is in a visible light frequency, the micro resonant structure can be used for visible light applications that currently employ prior art semiconductor light emitters (such as LCDs, LEDs, and the like that employ electroluminescence or other light-emitting principals). If small enough, such micro-resonance structures can rival semiconductor devices in size, and provide more intense, variable, and efficient light sources. Such micro resonant structures can also be used in place of (or in some cases, in addition to) any application employing non-semiconductor illuminators (such as incandescent, fluorescent, or other light sources). Those applications can include displays for personal or commercial use, home or business illumination, illumination for private display such as on computers, televisions or other screens, and for public display such as on signs, street lights, or other indoor or outdoor illumination. Visible frequency radiation from ultra-small resonant structures also has application in fiber optic communication, chip-to-chip signal coupling, other electronic signal coupling, and any other light-using applications.

Applications can also be envisioned for ultra-small resonant structures that emit in frequencies other than in the visible spectrum, such as for high frequency data carriers. Ultra-small resonant structures that emit at frequencies such as a few tens of terahertz can penetrate walls, making them invisible to a transceiver, which is exceedingly valuable for security applications. The ability to penetrate walls can also be used for imaging objects beyond the walls, which is also useful in, for example, security applications. X-ray frequencies can also be produced for use in medicine, diagnostics, security, construction or any other application where X-ray sources are currently used. Terahertz radiation from ultra-small resonant structures can be used in many of the known applications which now utilize x-rays, with the added advantage that the resulting radiation can be coherent and is non-ionizing.

The use of radiation per se in each of the above applications is not new. But, obtaining that radiation from particular kinds of increasingly small ultra-small resonant structures revolutionizes the way electromagnetic radiation is used in electronic and other devices. For example, the smaller the radiation emitting structure is, the less "real estate" is required to employ it in a commercial device. Since such real estate on a semiconductor, for example, is expensive, an ultra-small resonant structure that provides the myriad application benefits of radiation emission without consuming excessive real estate is valuable. Second, with the kinds of ultra-small resonant structures that we describe, the frequency of the radiation can be high enough to produce visible light of any color and low enough to extend into the terahertz levels (and conceivably even petahertz or exahertz levels with additional advances). Thus, the devices may be tunable to obtain any kind of white light transmission or any frequency or combination of frequencies desired without changing or stacking "bulbs," or other radiation emitters (visible or invisible).

Currently, LEDs and Solid State Lasers (SSLs) cannot be integrated onto silicon (although much effort has been spent trying). Further, even when LEDs and SSLs are mounted on a wafer, they produce only electromagnetic radiation at a single color. The present devices are easily integrated onto even an existing silicon microchip and can produce many frequencies of electromagnetic radiation at the same time.

Hence, there is a need for a device having a single basic construction that can couple energy from an electromagnetic wave over the full terahertz portion of the electromagnetic spectrum.

Glossary

As used throughout this document:

The phrase "ultra-small resonant structure" shall mean any structure of any material, type or microscopic size that by its characteristics causes electrons to resonate at a frequency in excess of the microwave frequency.

The term "ultra-small" within the phrase "ultra-small resonant structure" shall mean microscopic structural dimensions and shall include so-called "micro" structures, "nano" structures, or any other very small structures that will produce resonance at frequencies in excess of microwave frequencies.

Generally, a structure and method for coupling a high-speed signal on a device, carrying the signal through the device using plasmons, and then coupling the signal from the device is described. Energy can be modulated by the signal coupled to a source. At least a portion of the energy is typically coupled to a first portion of the device. Plasmons having fields are stimulated on the first portion as a function of the modulated energy. The energy from the source can include a charged particle beam or an electromagnetic wave. The electromagnetic wave can have a frequency range from about 0.1 terahertz (THz) (3000 microns) to about 7 petahertz (PHz) (0.4 nanometers), referred to as the terahertz portion of the electromagnetic spectrum. The plasmons having fields, modulated to carry the signal, are coupled to a second portion of the device. In one embodiment, an electromagnetic wave carrying the signal can be generated on the second portion and coupled from the device. In another embodiment, a charged particle beam can be directed to travel past or through intensified fields on the second portion. The charged particle beam can then be modulated by the intensified fields and couple the signal off the device.

Figure 2:
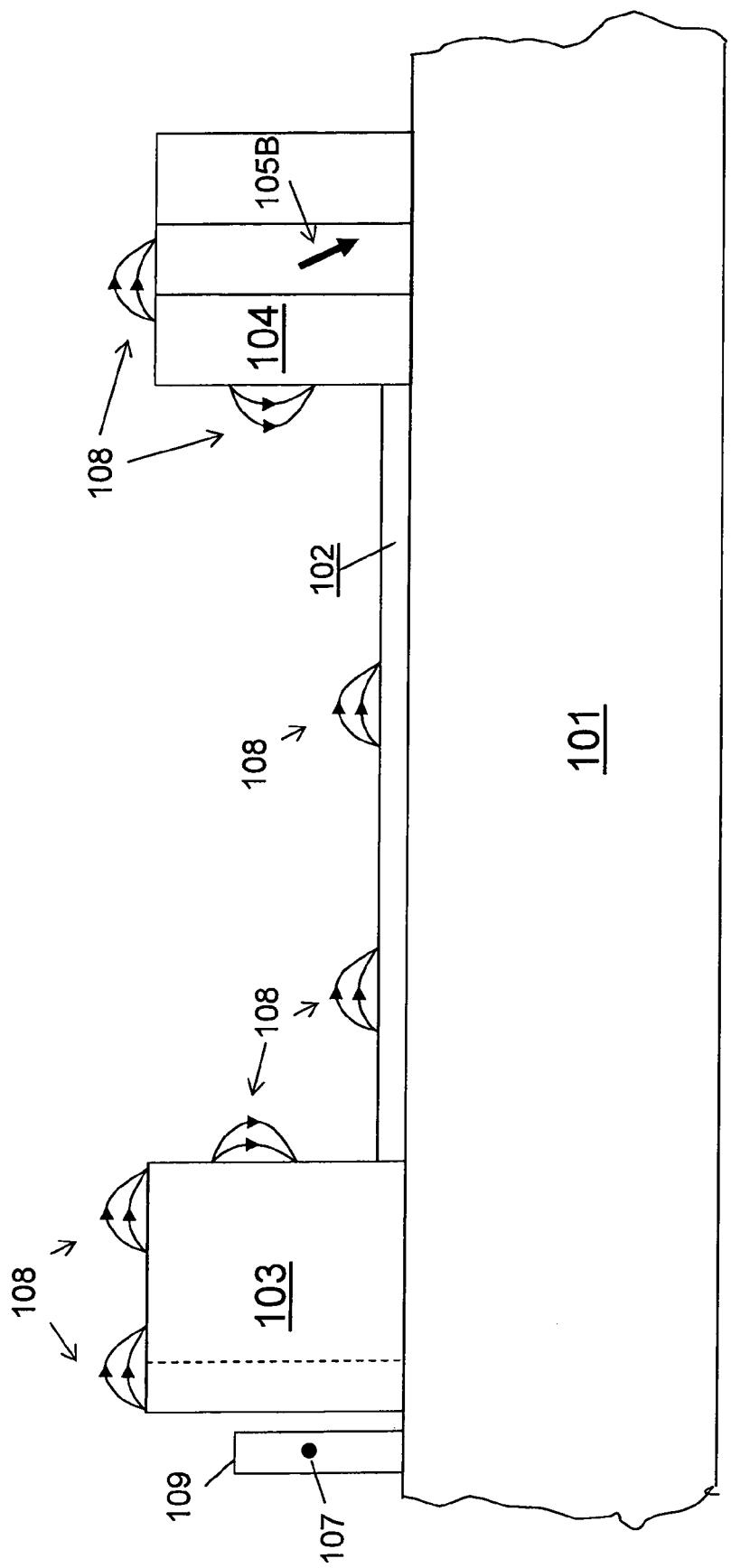
FIG. 2 is an enlarged side-view of the device of FIG. 1.

FIG. 1 is an enlarged top-view illustrating the coupling of a signal onto, through, and off a structure or device 100 using plasmons 108. FIG. 2 is the corresponding side-view. The signal comprises input signal 105A and output signal 105B, which are coupled onto and off the device 100, respectively. Preferably, input signal 105A will be transmitted through device 100 and will be output identically as output signal 105B, although loses or other modifications may occur to signal 105A (either passively or intentionally) before the input signal 105A is output as output signal 105B. Further, the signal through the device 100 is referred to as the input signal 105A. Microcircuits typically include a conducting layer disposed between the dielectric layers. The device 100 is typically formed within cavities between the dielectric layers of a microcircuit. Dielectric substrate 101 is the base dielectric layer on which the device 100 is formed. A microcircuit can be formed by using selective etch techniques well known in the semiconductor industry. For example, a selective etchant such as a hydrofluoric (HF) acid solution can remove phosphosilicate glass used for portions of the dielectric layers. The dielectric layers can include low-κ materials such as various SiLK type materials, silicon dioxide, silicon nitride, various TEOS type materials, phosphosilicate glass and the like.

Transmitting structure 103 and receiving structure 104 are formed on the substrate 101, but can also be formed on transmission line 102, as is shown in, e.g., figures corresponding to other embodiments. The transmission line 102 generally is made out of a portion of the microcircuit conducting layer between and adjacent to transmitting structure 103 and the receiving structure 104. The transmission line 102 couples plasmons 108 and the fields associated with the plasmons 108 between the transmitting structure 103 and receiving structure 104. In another embodiment (not shown), the transmission line connects between cavities formed within a microcircuit to couple plasmons between various structures.

The transmission line 102 can be made, e.g., using materials such as a strip of metal or metallization. Generally, the better the electrical conductivity of the material making up the transmission line 102, the stronger the transmission line 102 will conduct the plasmons 108. Typically, the transmission line 102 is made using materials such as gold (Au), silver (Ag), copper (Cu) and aluminum (Al). Those skilled in the art will realize and understand, upon reading this description, that other and/or different metals may be used. In another embodiment (not shown), the transmission line 102 includes a metal cladding or plating. Other materials may be used for applications in different carrier frequency regimes. Further, the performance of the transmission line 102 can be enhanced by using materials having a low percentage of impurities and a low frequency of grain boundaries.

The transmitting structure 103, as shown in FIGS. 1-2, is connected to an input end of the transmission line 102. The transmitting structure 103 can include resonant, sub-wavelength and wavelength structures and can be sized to a multiple of the wavelength. The shape of the transmitting structure 103 can be, e.g., spherical, cubical, triangular-pyramidal and the like. Even though the transmitting structure 103 is shown as generally cubical, this should not be considered limiting. The transmitting structure 103 can be formed, e.g., using the methods as described in the applications referenced in above.

The plasmons 108 can include bulk plasmons and surface plasmons. Plasmons, generally and particularly surface plasmons, are plasma oscillations or charge density waves confined to a surface of a metal. A strong interaction with plasmons can include using metals having a plasma frequency covering at least a portion of the optical and/or terahertz spectrum, depending on the application frequency. The plasma frequency is dependant upon the type of material used. For example, the plasma frequency of silver includes a range from the visible portion of the electromagnetic spectrum to the infrared. Hence, there is a strong interaction between silver and an electromagnetic wave between the visible and infrared portion of the electromagnetic spectrum. In general, the selection of the material depends on the required operating frequency of the device 100. For the visible portion of the electromagnetic spectrum, the surface of the transmitting structure 103 can preferably be made using materials such as gold, silver, copper, aluminum and the like. A structure made including at least these materials and having an appropriate size and shape can resonant for a given frequency or range of frequencies. This is referred to as plasmon resonance.

As shown in FIGS. 1-2, the receiving structure 104 is connected to an output end of the transmission line 102. The surface of the receiving structure 104 can be made using the same materials as used to make the surface of the transmitting structure 103. The size, shape and method of making the receiving structure 104 are generally similar to those of the transmitting structure 103. The surfaces of the transmitting structure 103, receiving structure 104, and transmission line 102 are normally made of materials having a strong interaction with plasmons at the frequency of operation of the device 100.

FIG. 1 illustrates the use of plasmons 108 for coupling the input signal 105A and output signal 105B, respectively on and off the device 100. Cavities (denoted C1 and C2 in the drawings) are shown formed in the transmitting structure 103 and receiving structure 104, respectively. The cavities can be formed using the techniques as described in the applications referenced above.

As shown in FIGS. 1-2, an energy source 109 is disposed on substrate 101 and provides a charged particle beam. As noted in the related applications, the particle beam may comprise any charged particles (such as, e.g., positive ions, negative ions, electrons, and protons and the like) and the source of charged particles may be any desired source of charged particles such as an ion gun, a thermionic filament, tungsten filament, a cathode, a vacuum triode, a planar vacuum triode, an electron-impact ionizer, a laser ionizer, a field emission cathode, a chemical ionizer, a thermal ionizer, an ion-impact ionizer, an electron source from a scanning electron microscope, etc. The type of particles provided by the source 109 is not limiting. Further, the source 109 can include plates or the like (not shown) for establishing an electric field that controls a path of the particle beam 107.

For the purposes of this description, the charged particle source 109 can include an electron gun, and the charged particle beam is sometimes referred to as an electron or particle beam 107.

The input signal 105A containing data can be coupled to the source 109 and encoded or modulated onto the particle beam 107. The method for modulating the charged particle beam 107 includes pulsing the particle beam 107 on and off. Further, the charged particle beam 107 can be modulated using techniques such as velocity and angular modulation. Velocity and angular modulation are described in related patent applications Ser. No. 11/238,991, filed Sep. 30, 2005, entitled. "Light Emitting Free Electron Micro-resonant Structure" and Ser. No. 11/243,476, filed Oct. 5, 2005, entitled "Structure and Method for Coupling Energy From an Electromagnetic Wave." The method of modulating the charged particle beam 107 is not limiting.

Once modulated, the charged particle beam 107 can be directed along a path between dielectric layers of a microcircuit and adjacent to the cavity C1 of the transmitting structure 103. The path can be generally straight, but is not required to be so. The cavity C1 of the transmitting structure 103 is preferably evacuated to a vacuum having a permittivity of about one. Fields are generated from the particle beam 107 and comprise energy in the form of electromagnetic, electric and/or magnetic fields. At least a portion of the energy 106A is coupled across the cavity C1 of the receiving structure 103 and received on the surface adjacent to the cavity. This provides a medium change for the coupled fields, because the permittivity or dielectric transitions from the cavity of the transmitting structure 103 (e.g., a vacuum) to the surface, which is metal. The gap across the cavity C1 can be sized to optimize the coupling of energy from the fields to the surface inside the cavity. The fields are modulated in accordance with the input signal 105A encoded onto the particle beam 107. The interaction between the fields and the surface, or free-electrons on the surface of the transmitting structure 103, causes a stimulation of the plasmons 108. This stimulation of the plasmons 108 is a function of the modulation of the fields and can include a resonant mode. The plasmons 108 are stimulated and modulated as a function of the input signal 105A.

The three arrows that are used in the drawings to represent plasmons 108 also indicate the general direction of travel of the plasmons 108. The energy distribution of plasmons 108 can be depicted as sinusoidal wave patterns, but the energy distribution of the plasmons 108 is not limited to a particular function. Even though the plasmons 108 are shown at particular locations in the drawings, Those skilled in the art will realize and understand, upon reading this description, that the plasmons 108 generally can occur throughout the transmitting structure 103, the transmission line 102 and the receiving structure 104, and their specific locations are not limiting.

Modulated fields are generated upon the modulated stimulation of the plasmons 108. The depiction of the plasmons 108 as loops on top of surfaces in the drawings is used to illustrate these fields. This representation of plasmons is not intended to be limiting in any way, e.g., such as to the location and the like.

Still referring to FIGS. 1 and 2, the plasmons 108 having fields are coupled to or further stimulated on the input end of the transmission line 102. The plasmons 108 are coupled along the transmission line 102 from the transmitting structure 103 and carry the input signal 105A. Plasmons 108 having fields are coupled or further stimulated on the receiving structure 104.

The cavity C2 of the receiving structure 104 can be sized to the resonant wavelength, sub-wavelength and multiple wavelengths of the energy. The fields can be intensified by using features on the receiving structure 104 such as the cavity. A portion of the fields are coupled across the cavity of the receiving structure 104 and are intensified and is referred to as portion fields. This can result in accelerating charges on the surface adjacent to the cavity. Further, the portion fields include a time-varying electric field component across the cavity. Thus, similar to an antenna, a modulated electromagnetic wave is generated and emitted from the cavity C2. Hence, the portion fields 106B modulate energy or the electromagnetic wave and couple the output signal 105B off the device 100. Further, by sizing the receiving structure 104 and the cavity of the receiving structure 104 to resonate at a particular wavelength, the frequency of the modulated electromagnetic wave carrying the signal 105B can be established.

A channel can be formed through a wall of a cavity of a microcircuit to couple the electromagnetic wave carrying the output signal 105B from the device 100. For example, the channel can be made using a dielectric material having a greater index of refraction than the material of dielectric layer. Hence, the output signal 105B is coupled from the structure or device 100.

Figure 3:
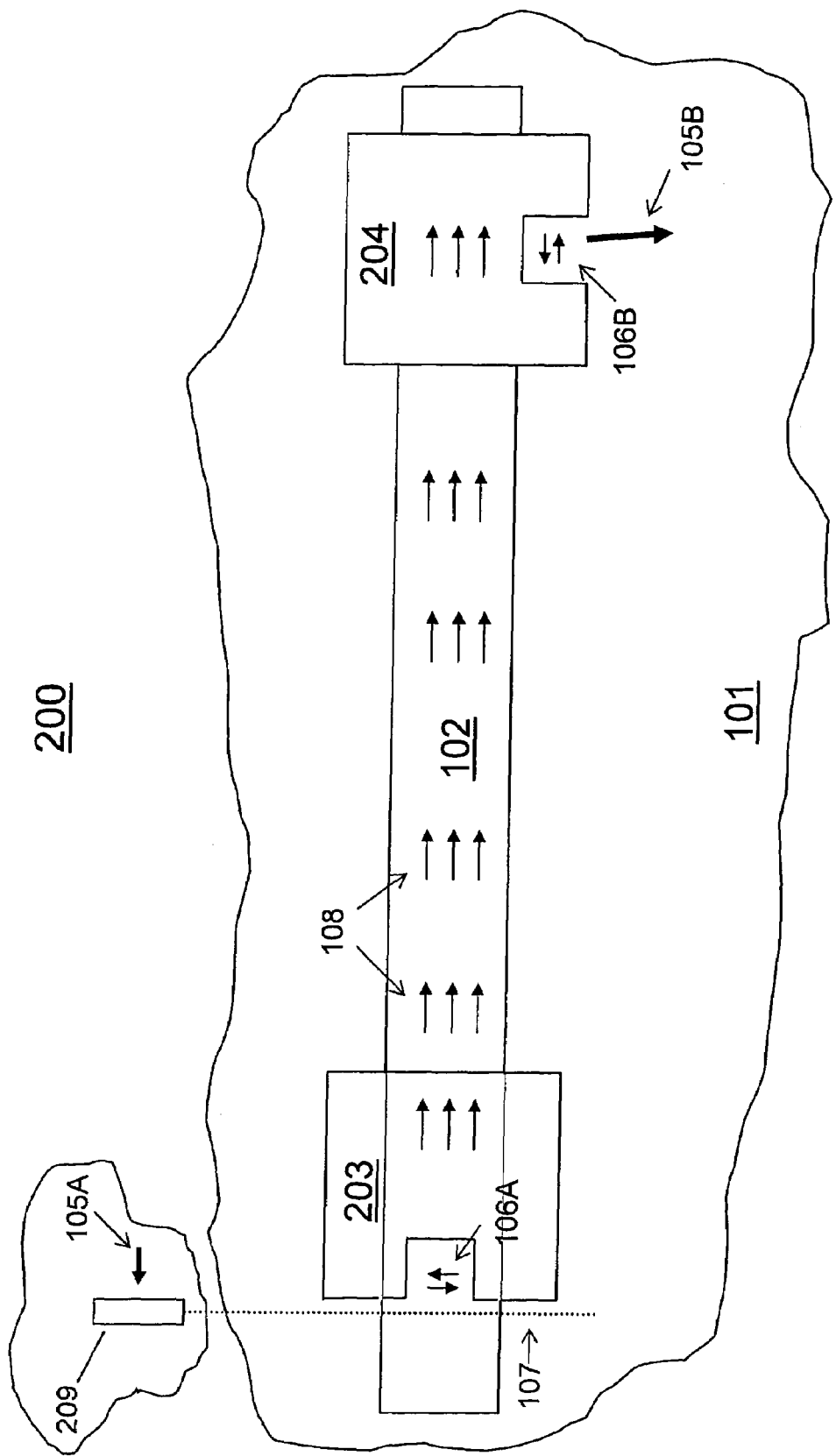
FIG. 3 is an enlarged top-view of a device on a surface of a microcircuit using plasmons to carry a signal in accordance with an another embodiment.
Figure 4:
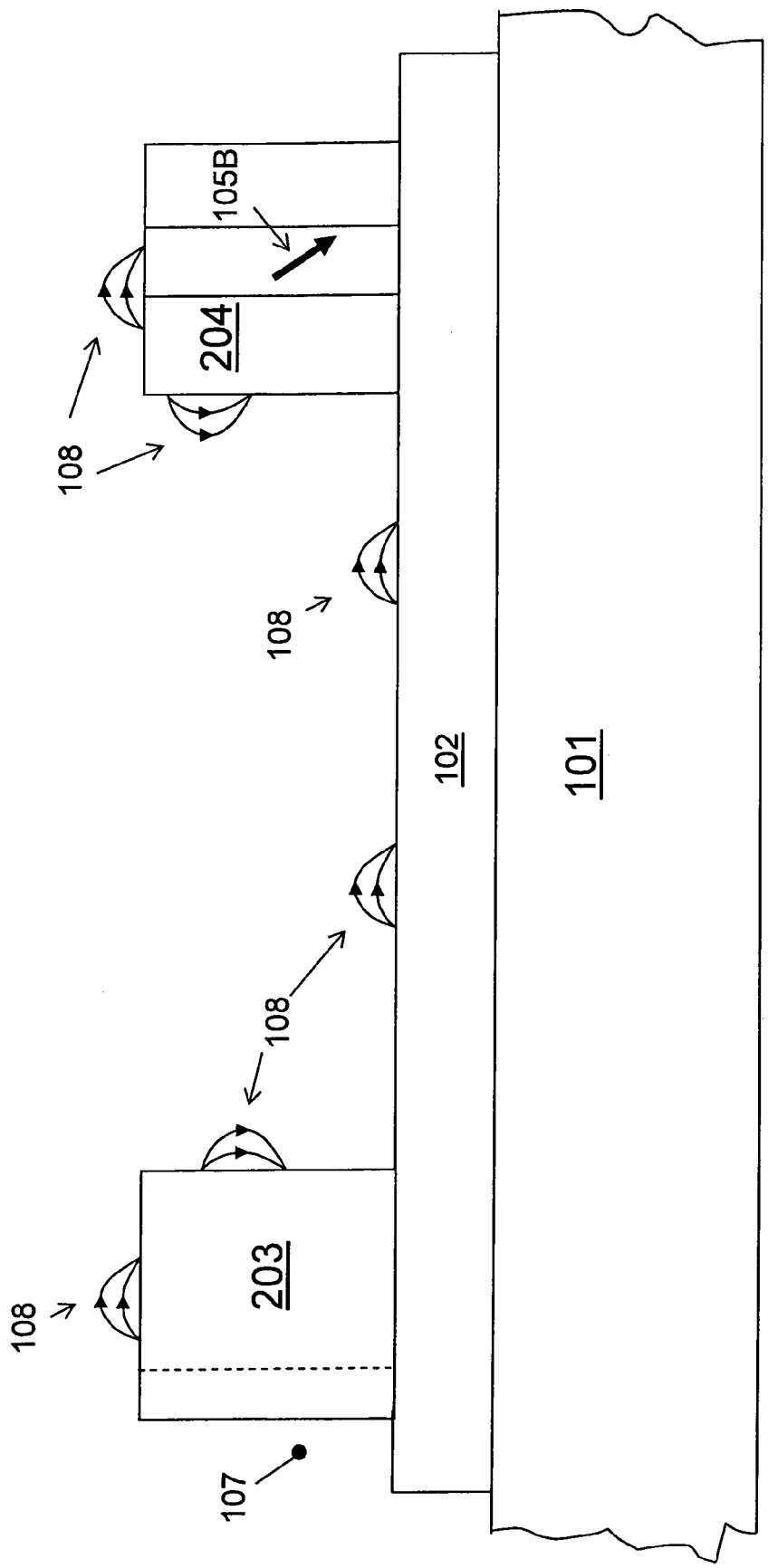
FIG. 4 is an enlarged side-view of the device of FIG. 3.

FIG. 3 is an enlarged top-view illustrating an alternative embodiment. FIG. 4 is the corresponding side-view of the device in FIG. 3. The device 200 in FIGS. 3-4 is the substantially the same as the device 100, except that transmitting structure 203 and receiving structure 204 are formed on transmission line 102, instead of on substrate 101, and source 209 is formed externally or apart from the device 200. Device 200 functions in a similar manner to device 100 and as such will not be described herein.

Figure 5:
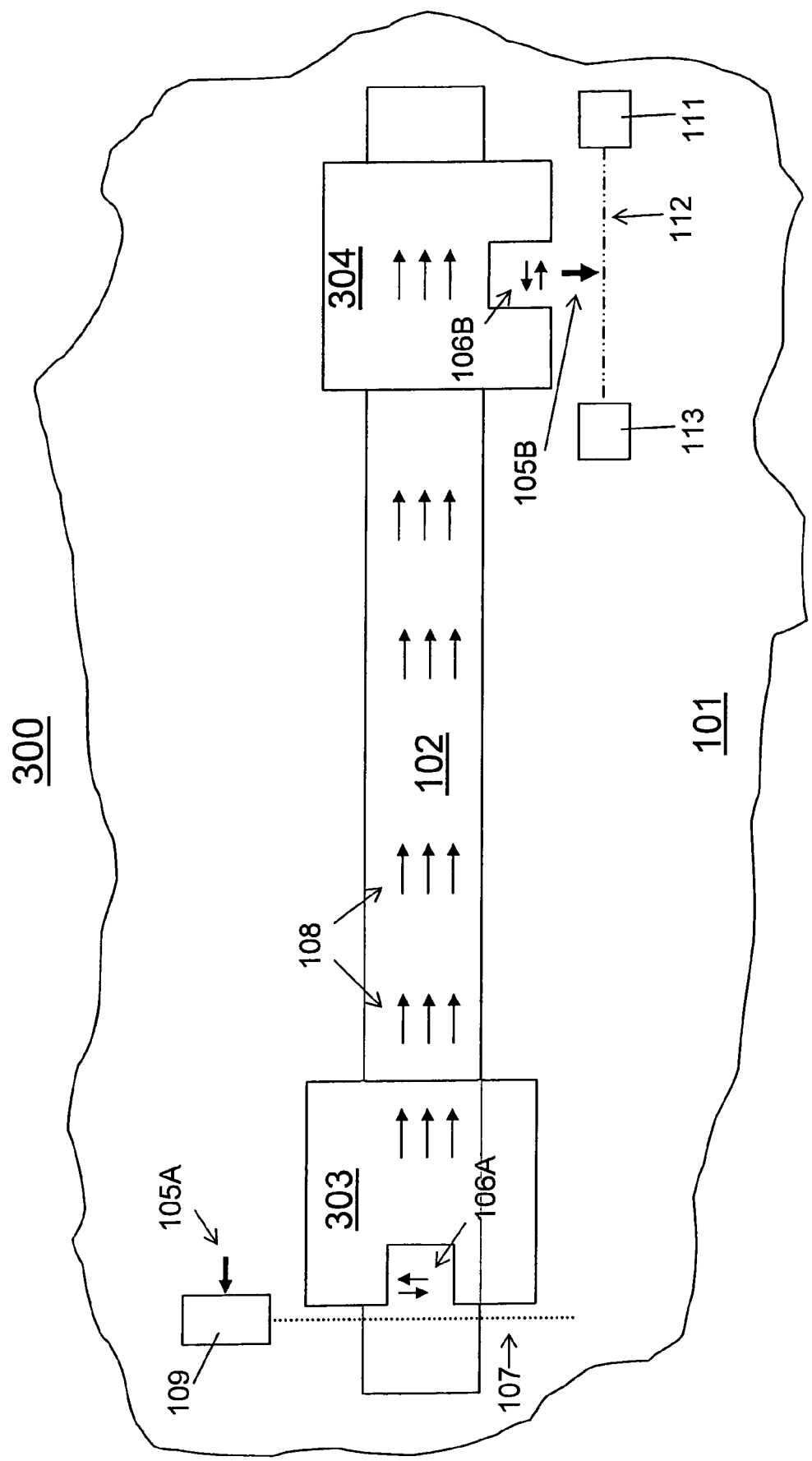
FIG. 5 is an enlarged top-view of a device on a surface of a microcircuit using plasmons to carry a signal in accordance with yet another embodiment.
Figure 6:
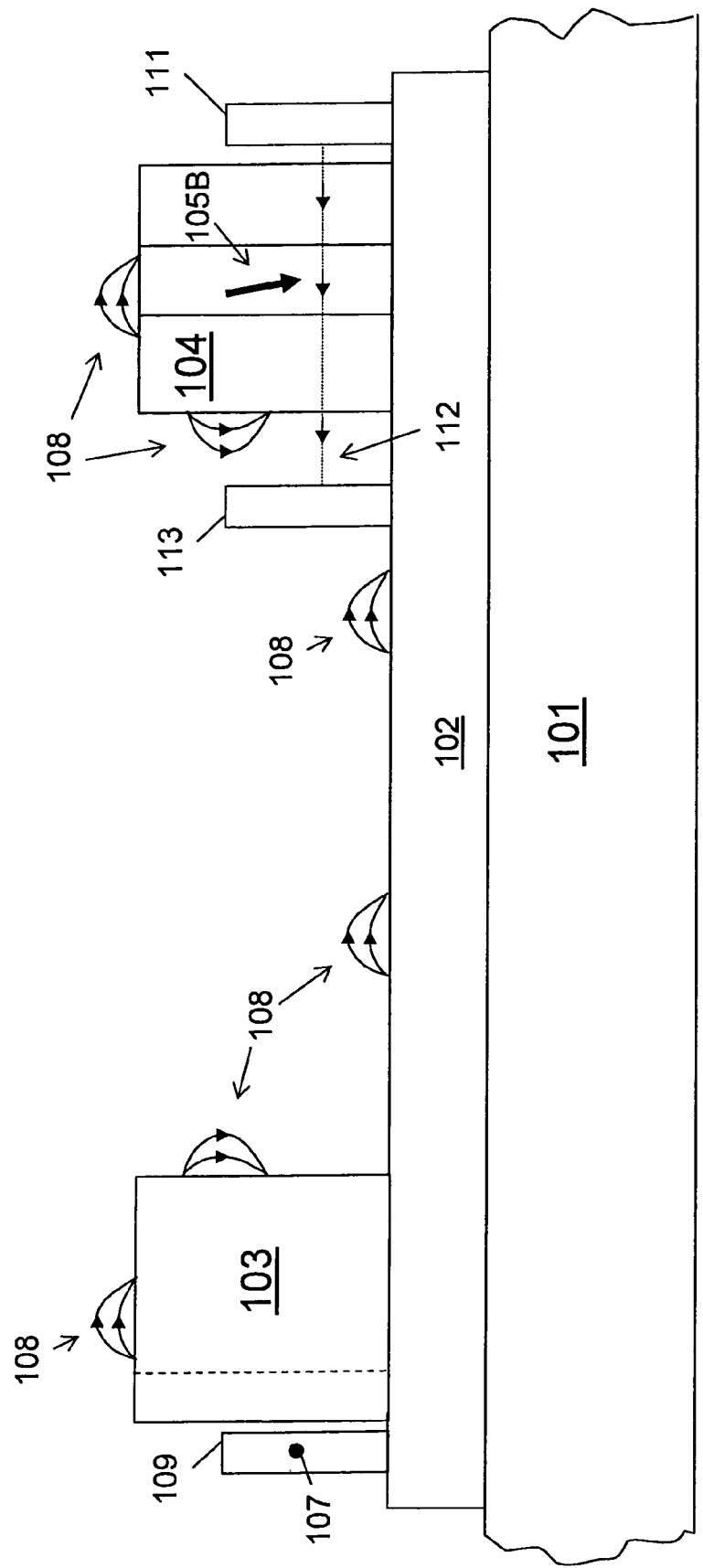
FIG. 6 is an enlarged side-view of the device of FIG. 1.

FIG. 5 is an enlarged top-view illustrating another alternative embodiment. FIG. 6 is the corresponding side-view of the device of FIG. 5. Device 300 is substantially the same as device 100, except that transmitting structure 303 and receiving structure 304 are formed on transmission line 102, instead of on substrate 101 and an additional source of charged particles 111 is provided, e.g., formed on the surface of the substrate 101. The source 111 provides particle beam 112. The input signal 105A containing data can be coupled to the source to modulate the charged particle beam 107. Once modulated, the charged particle beam 107 can be directed along a path through a space adjacent to the cavity having a gap. Similarly as described with reference to FIG. 1, the plasmons 108 having fields are generated and coupled along the transmission line 102 to the receiving structure 104. The portion fields 106B are coupled across the cavity of the receiving structure 104 and are intensified.

A charged particle source 111 is formed on the surface of the substrate 101. The charged particle source 111 can include positively or negatively charged ions, protons, electrons, and the like. As noted in the related applications, the particle beam may comprise any charged particles (such as, , e.g., positive ions, negative ions, electrons, and protons and the like) and the source of charged particles may be any desired source of charged particles such as an ion gun, a thermionic filament, tungsten filament, a cathode, a vacuum triode, a planar vacuum triode, an electron-impact ionizer, a laser ionizer, a field emission cathode, a chemical ionizer, a thermal ionizer, an ion-impact ionizer, an electron source from a scanning electron microscope, etc. For the purposes of this description, the charged particle beam can also be referred to as a particle beam 112. The type of particles provided by the source 111 is not limiting. The particle beam 112 travels along a path generally parallel to the portion fields 106B coupled across the cavity. An interaction between the portion fields 106B and the particle beam 112 results in the particles within the particle beam to be sped up and slowed down. For example, the particles are represented by dot-dash line 112. The dash is used to depict a cluster of slowed down particles. An individual particle which is spaced apart from the cluster of particles is a particle with an increased velocity and is represented by a dot. This change in speed or velocity is referred to as velocity modulation. Hence, the portion fields 106B modulate energy or the particle beam 112 and couple the output signal 105B off the device 300.

A detector 113 formed on the surface of substrate 101 receives the charged particle beam 112. For example, the detector 113 can include cavities (not shown) for detecting the particle beam 112. The detector 113 can include a Faraday cup and can couple the modulations from the device 300. For example, an electrical connection can be made to the detector 113 to couple the modulated signal from the device 300 to other circuitry (not shown).

Figure 7:
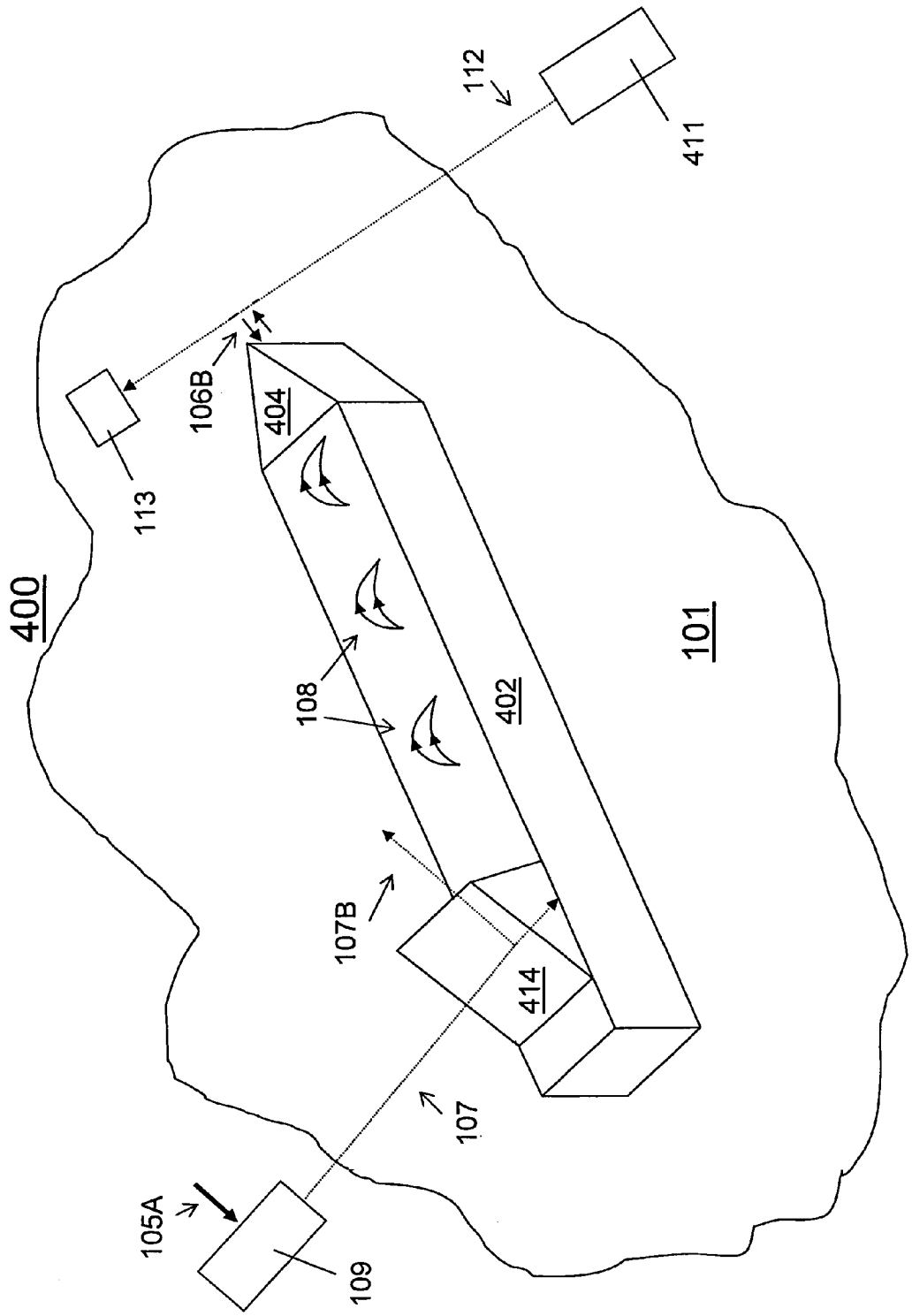
FIG. 7 is an enlarged perspective-view of a device on a surface of a microcircuit using plasmons to carry a signal in accordance with yet another embodiment.

FIG. 7 is an enlarged perspective-view illustrating the use of plasmons 108 for coupling the input signal 105A and output signal 105B, respectively on and off a structure or device 400. A microcircuit can include a device 400 having a structure or transmission line 402, an optical device 414 and a receiving structure 404. The transmission line 402 is shown formed on a surface of a substrate 101 of a microcircuit. The transmission line 402 can be made using electrical conductive materials having a strong interaction with plasmons 108. These materials can include a strip of metal or metallization. For example, at the optical frequencies, copper, silver and gold can be used. As discussed with reference to the embodiments of FIG. 1, the formation of the transmission line 402 is not limiting. The substrate 101 can be made using materials similar to those used for the embodiment of FIG. 1.

The transmission line 402 includes input and output portions. Generally, the input and output portions are the parts of the transmission line 402 in the vicinity or adjacent to an optical device 414 and receiving structure 404, respectively. The optical device 414 is formed on the surface of the input portion of the transmission line 402. The optical device 414 can include a prism (as shown), a diffraction grating, a rough surface, resonant structures, and the like. The optical device 414 can be formed using techniques commonly known in the semiconductor industry. These techniques can include various forms of chemical vapor deposition (CVD) and plasma enhanced vapor deposition (PECVD) or grown thermally. The optical device 414 can be shaped using various wet and dry etch techniques well known to those skilled in the art. A surface of the optical device 421 can include an anti-reflective coating (ARC), such as zinc sulfide, and the like. The construction of the optical device 414 is not limiting.

The output portion of the transmission line 402 can be tapered to form a point using etch techniques well know in the art and is referred to as a receiving structure 404. The transmitting structure 404 can be made by etching sides of the output portion to form the point. The method of forming the point and the degree of taper of the sides is not limiting.

Still referring to FIG. 7, a source 109 provides an electromagnetic wave 107. The electromagnetic wave 107 can be modulated using an input signal 105A connected to the source 109. The modulated electromagnetic wave 107 is directed onto the surface of the optical device 414 as shown. The electromagnetic wave 107 is coupled through the optical device 414. Plasmons 108 are stimulated on the surface of the transmission line 402 from a portion of the energy from the electromagnetic wave 107. The plasmons 108 having fields are stimulated as a function of the electromagnetic wave 107, which has been modulated by the input signal 105A. This provides modulated plasmons 108. A portion 107B of the electromagnetic wave 107 is reflected from the device 400.

The transmission line 402 couples the plasmons 108 having fields to the receiving structure 404. The pointed portion of the receiving structure 404 intensifies magnetic and/or electric fields associated with the plasmons 108 providing the portion fields 106B as shown. The portion fields 106B are modulated as a function of the plasmons 108.

A charged particle source 411 is shown formed externally to the device 400. A charged particle beam from the charged particle source 411 can include positively or negatively charged ions, protons, electrons and the like. As noted in the related applications, the particle beam may comprise any charged particles (such as, , e.g., positive ions, negative ions, electrons, and protons and the like) and the source of charged particles may be any desired source of charged particles such as an ion gun, a thermionic filament, tungsten filament, a cathode, a vacuum triode, a planar vacuum triode, an electron-impact ionizer, a laser ionizer, a field emission cathode, a chemical ionizer, a thermal ionizer, an ion-impact ionizer, an electron source from a scanning electron microscope, etc. For the purposes of this description, the charged particle source 411 provides a particle beam 112. The type of particles provided by the source 411 is not limiting. The particle beam 112 travels along a path adjacent to the point of the receiving structure 404. Modulation of the particle beam 112 occurs by interaction with the portion fields 106B. Depending on the orientation between the particle beam 112 and the portion fields 116B, the modulation of the particle beam 112 can be angular or velocity modulated. Hence, the portion fields 106B modulate energy of the particle beam 112 and couple the output signal off the device 400.

A detector 113 formed, e.g., on the surface receives the particle beam 112 and can be used to detect the output modulations in the particle beam 112. The detector 113 can include a Faraday cup and can couple the modulations from the device 400. For example, an electrical connection can be made to the detector 113 to couple the modulated signal from the device 400 to other circuitry (not shown).

Figure 8:
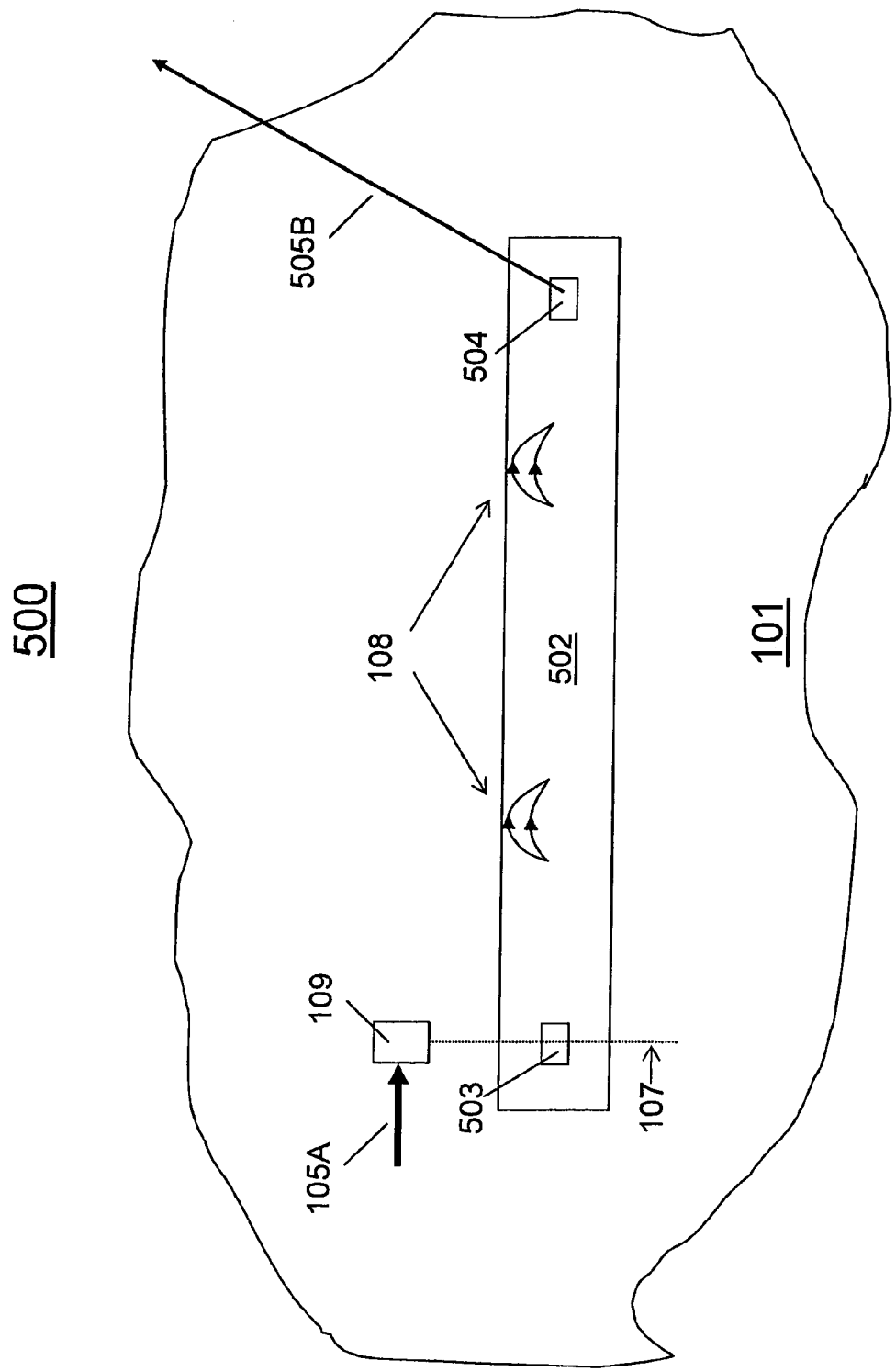
FIG. 8 is an enlarged top-view of a device on a surface of a microcircuit using plasmons to carry a signal in accordance with yet another embodiment.

FIG. 8 is an enlarged perspective-view illustrating the use of plasmons 108 for coupling the input signals 105A and output signals 105B, respectively on and off a structure or device 500. A microcircuit can include a device 500 having a structure or transmission line 502. The transmission line 502 is formed on a surface of a substrate 101 of a microcircuit. As with the embodiment of FIG. 1, the transmission line 502 is not limited to being formed on the substrate 101. The substrate 101 can be made using materials similar to those discussed with respect to FIG. 1.

The transmission line 502 includes input and output portions having respective cavities 503 and 504. A surface of the transmission line 502 is further included on the inside walls of the cavities 503 and 504 and preferably is made of materials having a strong interaction with plasmons 108. The cavities

503 and 504 can be formed using the methods as described in the applications referenced above.

A source 109 provides the energy for stimulating the plasmons 108. The source 109 is shown formed on the surface of substrate 101 and can provide energy using the particle beam 107. In other embodiments (not shown), the source can be provided from another device. The input signal 105A containing data can be coupled to the source 109 to modulate the particle beam 107. Once modulated, the particle beam 107 can be directed through a space to travel past or by the cavity 503. As similarly described with reference to the embodiment of FIG. 2, fields are generated from the particle beam 107 and couple at least a portion of the energy to the walls of the cavity 503. The cavity 503 can be sized to the resonant wavelength, sub-wavelength and multiple wavelengths of the energy. The plasmons 108 having fields are stimulated on the input portion of the transmission line 502 and are modulated as a function of the input signal 105A. The modulated plasmons 108 having fields carrying the input signal 105A are coupled along the transmission line 102 to the output portion. The portion fields (not shown) couple energy across the cavity 504 and are intensified. The cavity 504 can be sized to the resonant wavelength, sub-wavelength and multiple wavelength of the energy. Energy or the electromagnetic wave 505B is generated and emitted from the cavity 504 and is modulated as a function of the portion fields. Hence, the output signal 505B is coupled off the device 500.

Methods of making a device for detecting an electromagnetic wave as can be employed herein may use the techniques included under U.S. application Ser. No. 10/917,571, filed on Aug. 13, 2004, entitled "Patterning Thin Metal Film by Dry Reactive Ion Etching" and/or U.S. application Ser. No. 11/203,407, filed Aug. 15, 2005, entitled "Method of Patterning Ultra-Small Structures," each of which is commonly owned at the time of filing, the entire contents of each of which are incorporated herein by reference. Other manufacturing techniques may also be used.

In the embodiments above, the receiver and transmitter structures are described formed on, adjacent to or in the transmission line. Those skilled in the art will realize and understand, upon reading this description, that various combinations of these formations may be used. There is no need for the receiver structure and the transmitter structure to be formed on the same surface or substrate or to be formed in the same way as each other. For example, the receiver may be formed on the transmission line while the transmitter may be formed in or adjacent to the line. All combinations of location are contemplated herein.

A device is thus provided that can be used on a microcircuit and can receive a signal that stimulates plasmons on the device as a function of the signal. Sources for coupling the signal on the device and stimulating plasmons can include a charged particle beam, an electromagnetic wave and the like. The signal is coupled through the device in the form of modulated plasmons having fields. The signal can be coupled from the plasmons and out of the device. The sources for coupling the signal in or out of the device can be provided by another device or included on the device. Further, the device can be made in a final metallization step in the fabrication of the microcircuit or made in an early metallization step to form the device within the microcircuit. Further yet, the transmission line can include a metal strip comprising a portion of the microcircuit metallization. The metal strip can couple both plasmon signals and electronic signals on the same metallization without crosstalk or interference between the two types of signals.

In general, the various beams of charged particles used in the various embodiments may comprise any charged particles (such as, e.g., positive ions, negative ions, electrons, and protons and the like) and the source of charged particles may be any desired source of charged particles such as an ion gun, a thermionic filament, tungsten filament, a cathode, a vacuum triode, a planar vacuum triode, an electron-impact ionizer, a laser ionizer, a field emission cathode, a chemical ionizer, a thermal ionizer, an ion-impact ionizer, an electron source from a scanning electron microscope, etc. In embodiments which use more than one source of charged particles, the particles and/or sources of charged particles may be of the same or different types. Further, in general, the various sources of charged particles may be provided on the same substrate as the coupling structure, or on different substrates.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A device for coupling an input signal to an output signal, the device comprising:
   a metal transmission line;
   an ultra-small resonant receiver structure operatively connected to an end of the transmission line constructed to receive the input signal and to cause at least part of the input signal to be passed along the transmission line in the form of plasmons;
   an ultra-small resonant transmitter structure operatively connected to another end of the transmission line and constructed to receive at least some of the plasmons corresponding to the input signal on the transmission line and to transmit the received signal as an output signal;
   a source of charged particles constructed to deliver a linear beam of charged particles along a path adjacent to but not touching the ultra-small resonant receiver structure to cause the receiver structure to resonate in the presence of the beam, wherein the input signal is encoded in the beam of charged particles; and
   a detector mechanism constructed to detect the output signal from the ultra-small resonant transmitter structure and to provide a signal representative of the output signal to another circuit.

2. A device for coupling an input signal to an output signal, the device comprising:
   a transmission line;
   an ultra-small resonant receiver structure operatively connected to the transmission line constructed to receive the input signal and to cause at least part of the input signal to be passed along the transmission line in the form of plasmons;
   an ultra-small resonant transmitter structure operatively connected to the transmission line and constructed to receive at least some of the plasmons corresponding to the input signal on the transmission line and to transmit the received signal as an output signal; and
   a source of charged particles constructed to deliver a linear beam of charged particles along a path adjacent to but not touching the ultra-small resonant receiver structure to cause the receiver structure to resonate in the presence of the beam, wherein the input signal is encoded in the beam of charged particles.

3. A device as in claim 2 wherein the transmission line is formed on a substrate and wherein the ultra-small resonant receiver structure is formed on the substrate.

4. A device as in claim 2 wherein the transmission line is formed on a substrate and wherein the ultra-small resonant transmitter structure is formed on the substrate.

5. A device as in claim 2 wherein the transmission line is formed on a substrate and wherein the ultra-small resonant receiver structure does not touch the substrate.

6. A device as in claim 2 wherein the transmission line is formed on a substrate and wherein the ultra-small resonant transmitter structure does not touch the substrate.

7. A device as in claim 2 wherein the ultra-small resonant receiver structure is formed by a cavity formed in a portion of the transmission line.

8. A device as in claim 2 wherein the ultra-small resonant transmitter structure is formed by a cavity formed in a portion of the transmission line.

9. A device as in claim 2 wherein the ultra-small resonant receiver structure is formed at one end of the transmission line and wherein the ultra-small resonant transmitter structure is formed at another end of the transmission line.

10. A device as in claim 2 wherein the ultra-small resonant receiver structure has a cavity formed therein.

11. A device as in claim 2 wherein the ultra-small resonant transmitter structure has a cavity formed therein.

12. A device as in claim 2 wherein the transmission line is formed from a metal.

13. A device as in claim 2 wherein the metal is selected from the group comprising:
gold (Au), silver (Ag), copper (Cu) and aluminum (Al).

14. A device as in claim 2 wherein the source of charged particles is selected from the group comprising:
an ion gun, a thermionic filament, tungsten filament, a cathode, a vacuum triode, a field emission cathode, a planar vacuum triode, an electron-impact ionizer, a laser ionizer, a chemical ionizer, a thermal ionizer an ion impact ionizer.

15. A device as in claim 2 wherein the beam of charged particles comprises particles selected from the group comprising:
positive ions, negative ions, electrons, and protons.

16. A device as in claim 2 wherein the input signal is encoded in a beam of charged particles.

17. A device as in claim 2 further comprising:
a detector mechanism constructed to detect the output signal from the ultra-small resonant transmitter structure.

18. A device as in claim 17 wherein the detector mechanism is further constructed to provide a signal representative of the output signal to another circuit.

19. A method comprising:
providing a transmission line;
providing an ultra-small resonant receiver structure operatively connected to an end of the transmission line and constructed to receive an input signal and to cause at least part of the input signal to be passed along the transmission line in the form of plasmons;
providing an ultra-small resonant transmitter structure operatively connected to another end of the transmission line and constructed to receive at least some of the plasmons corresponding to the input signal on the transmission line and to transmit the received signal as an output signal;
providing a linear beam of charged particles along a path adjacent to but not touching the ultra-small resonant receiver structure, wherein the input signal is encoded in the beam of charged particles; and
detecting the output signal from the ultra-small resonant transmitter structure.

20. A method as in claim 19 further comprising:
providing a signal representative of the output signal to another circuit.

* * * * *